US 6,607,854 B1

(12) United States Patent
Rehg et al.

(10) Patent No.: US 6,607,854 B1
(45) Date of Patent: Aug. 19, 2003

(54) THREE-WHEEL AIR TURBOCOMPRESSOR FOR PEM FUEL CELL SYSTEMS

(75) Inventors: Tim Rehg, Rancho Palos Verdes, CA (US); Mark Gee, South Pasadena, CA (US); Terence P. Emerson, Hermosa Beach, CA (US); Joe Ferrall, Simi Valley, CA (US); Pavel Sokolov, Redondo Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 73 days.

(21) Appl. No.: 09/712,621

(22) Filed: Nov. 13, 2000

(51) Int. Cl.[7] .............................. H01M 8/04; H01M 8/06
(52) U.S. Cl. .............................. 429/13; 429/17; 429/20; 429/26
(58) Field of Search .............................. 429/12, 13, 17, 429/19, 20, 26

(56) References Cited

U.S. PATENT DOCUMENTS

| 3,976,506 A | 8/1976 | Landau |
| 3,982,962 A | 9/1976 | Bloomfield |
| 4,041,210 A | 8/1977 | Van Dine |
| 4,685,287 A | 8/1987 | Takuma ..................... 60/39.07 |
| 4,738,903 A | 4/1988 | Garow et al. |
| 4,879,189 A | 11/1989 | Snopkowski |
| 5,319,925 A | 6/1994 | Hendriks et al. ......... 60/39.183 |
| 5,360,679 A | 11/1994 | Buswell et al. ............... 429/19 |
| 5,449,568 A | 9/1995 | Micheli et al. ............... 429/20 |
| 5,523,176 A | 6/1996 | Fonda-Bonardi |
| 6,306,532 B1 * | 10/2001 | Kurita et al. .................. 429/20 |

FOREIGN PATENT DOCUMENTS

| DE | 198 56 942 | 4/2000 |
| JP | 60-028173 | 2/1985 |
| JP | 5-129029 | 5/1993 |
| JP | 11-67240 | * 3/1999 |

OTHER PUBLICATIONS

Ferrall et al., *Design and Development of an Air–Reformate PEM Fuel Cell Stack System for Light–Duty Vehicles*, Proceedings of 2000 Future Car Congress, Apr. 2–6, 2000, Crystal City, VA.

* cited by examiner

Primary Examiner—Carol Chaney
Assistant Examiner—Susy Tsang-Foster
(74) Attorney, Agent, or Firm—William J. Zak, Jr., Esq.

(57) ABSTRACT

A fuel cell system comprises a compressor and a fuel processor downstream of the compressor. A fuel cell stack is in communication with the fuel processor and compressor. A combustor is downstream of the fuel cell stack. First and second turbines are downstream of the fuel processor and in parallel flow communication with one another. A distribution valve is in communication with the first and second turbines. The first and second turbines are mechanically engaged to the compressor. A bypass valve is intermediate the compressor and the second turbine, with the bypass valve enabling a compressed gas from the compressor to bypass the fuel processor.

58 Claims, 8 Drawing Sheets

THREE-WHEEL AIR TURBOCOMPRESSOR FOR PEM FUEL CELL SYSTEMS

GOVERNMENT RIGHTS

The United States Goverment has rights in the present invention pursuant to Contract No. DE-FC02-97EE50470 issued by the Department of Energy.

BACKGROUND OF THE INVENTION

The present invention generally relates to fuel cell systems and, more particularly, to a fuel cell system that utilizes a pair of parallel turbines engaged to a compressor for increased system efficiency.

In a fuel cell system, power parasites—such as compressors, fans, and pumps—reduce the overall system efficiency and cause an increase in the fuel cell size and, therefore an increase in system cost. However, the stack size and cost can be reduced substantially if the system is designed to operate at elevated pressure. If the fuel cell system uses pressurized air, then a compressor-expander must often be used.

Important characteristics of the compressor-expander are its operating line, as well as its compressor and expander isentropic efficiencies. The operating line is defined as the dependence of the air pressure versus the airflow rate delivered to the fuel cell. As a general rule, a flat operating line is preferred where the pressure is constant at all operating points of the compressor-expander. The compressor and expander efficiencies are typically optimized at a selected design point, which is usually at maximum system power. But in doing so, compressor and expander efficiencies can be substantially reduced at part load because the compressor-expander operating point is far removed from the optimal design point.

A turbocompressor (or a turbocharger) is considered to be a preferred option for pressurization because of its high efficiency, relatively small volume and weight, and potentially low air contamination, if oil-less bearings are used. However, the characteristics of the turbocompressor (turbocharger) are often such that it provides air at a substantially lower pressure at part power system loads. Thus, it has a steep operating line—i.e., both compressor and turbine efficiencies can be substantially reduced at part loads. As a result, the lower pressure and the lower efficiencies lead to a lower overall system efficiency, in addition to an increased fuel cell stack size and cost.

In an effort to address the problem of operating at part load, U.S. Pat. No. 3,976,506 provides in a phosphoric acid system a compressor engaged to a single turbine. Waste energy in the form of hot pressurized gases in the system drives the compressor. At reduced loads, a portion of the compressed air from the compressor is bypassed around the fuel cell stack, is increased in temperature in an auxiliary burner where additional fuel is burned, and is flowed to the turbine to drive the compressor. The pressure of the air to the fuel cell stack is maintained while the amount of the air to the stack is reduced. Disadvantages to this design include the fact additional fuel must be burned to achieve the required compressor speed to maintain elevated pressure, which reduces the overall system efficiency.

In U.S. Pat. No. 4,041,210, a power plant for molten carbonate fuel cells includes a pair of two-wheel turbochargers are provided such that the compressor and turbine of one turbocharger are not engaged to the compressor and turbine of the other turbocharger. A portion of the fuel cell oxidant effluent is recycled while another portion drives the turbochargers. A recycle pump is driven by one of the turbochargers to assist in recycling. One disadvantage of this design, or any fuel cell system that includes one or more turbochargers or turbocompressors comprised of a single turbine engaged to one or more compressors, is that there is not a means to optimize the performance of each turbocharger or turbocompressor at part load. At part load, the turbine power will decrease due to both lower mass flow and reduced efficiency. Consequently, the power delivered to the compressor is reduced, thereby reducing system pressure.

A pair of turbines and a single compressor is provided in U.S. Pat. No. 3,982,962 wherein the two turbines are not engaged to one another. One turbine is engaged to the compressor and is driven by steam from a reactor burner that uses anode effluent from the fuel cell stack. The steam is condensed to liquid upon passing through the turbine, reconverted to steam by the fuel cell stack, and recycled to the turbine. The other turbine is air driven from anode and cathode effluent and can drive a generator as well as provide back-pressure to the power plant. Some of the disadvantages to this design are related to operation at part load. The performance of each turbine can not be optimized at part load, thus turbine power is reduced at part load due to both a reduction in mass flow and a reduction in turbine efficiency. The reduction in turbine power leads to reduced power to the compressor and a reduction in system pressure.

As can be seen, there is a need for an apparatus and method of providing a pressurized oxidant gas in a fuel cell power plant system. A further need is for an apparatus and method of providing pressurized oxidant gas in a fuel cell power plant system operating at reduced loads. An apparatus and method are also needed that increase the efficiency of a fuel cell power plant and, particularly a PEM fuel cell power plant, by providing substantially constant pressure at all operating points of the power plant. In other words, a flatter pressure operating line is needed for PEM fuel cell systems.

SUMMARY OF THE INVENTION

In one aspect of the present invention, a fuel cell system comprises a compressor; a fuel processor downstream of the compressor; a fuel cell stack in communication with the fuel processor and compressor; a combustor downsteam of the fuel cell stack; a first turbine downstream of the fuel processor; a second turbine downstream of the fuel processor and in parallel flow communication with the first turbine, and the second turbine being mechanically engaged to the compressor and first turbine; a bypass valve intermediate the compressor and second turbine, with the bypass valve enabling a compressed gas from the compressor to bypass the fuel processor; and a distribution valve in communication with the first and second turbines.

In another aspect of the present invention, a method of processing an oxidant gas and a fuel gas for a fuel cell stack comprises compressing the oxidant gas in a compressor to produce a compressed oxidant gas; flowing a first portion of the compressed oxidant gas to a fuel cell stack; flowing a second portion of the compressed oxidant gas to a fuel processor; flowing the fuel to the fuel processor to produce a hydrogen-rich gas; flowing the hydrogen-rich gas to the fuel cell stack; producing a heated oxidant gas from the fuel processor; splitting the heated oxidant gas into a first portion and a second portion of heated oxidant gas such that the first and second portions of heated oxidant gas flow parallel to one another; expanding the first portion of the heated oxidant gas in a first turbine to produce a first turbine exhaust; expanding the second portion of the heated oxidant gas in a second turbine to produce a second turbine exhaust; and mechanically engage the compressor, first turbine and second turbine to one another.

These and other features, aspects and advantages of the present invention will become better understood with reference to the following drawings, description and claims.

DETAILED DESCRIPTION OF THE INVENTION

Figure 1:
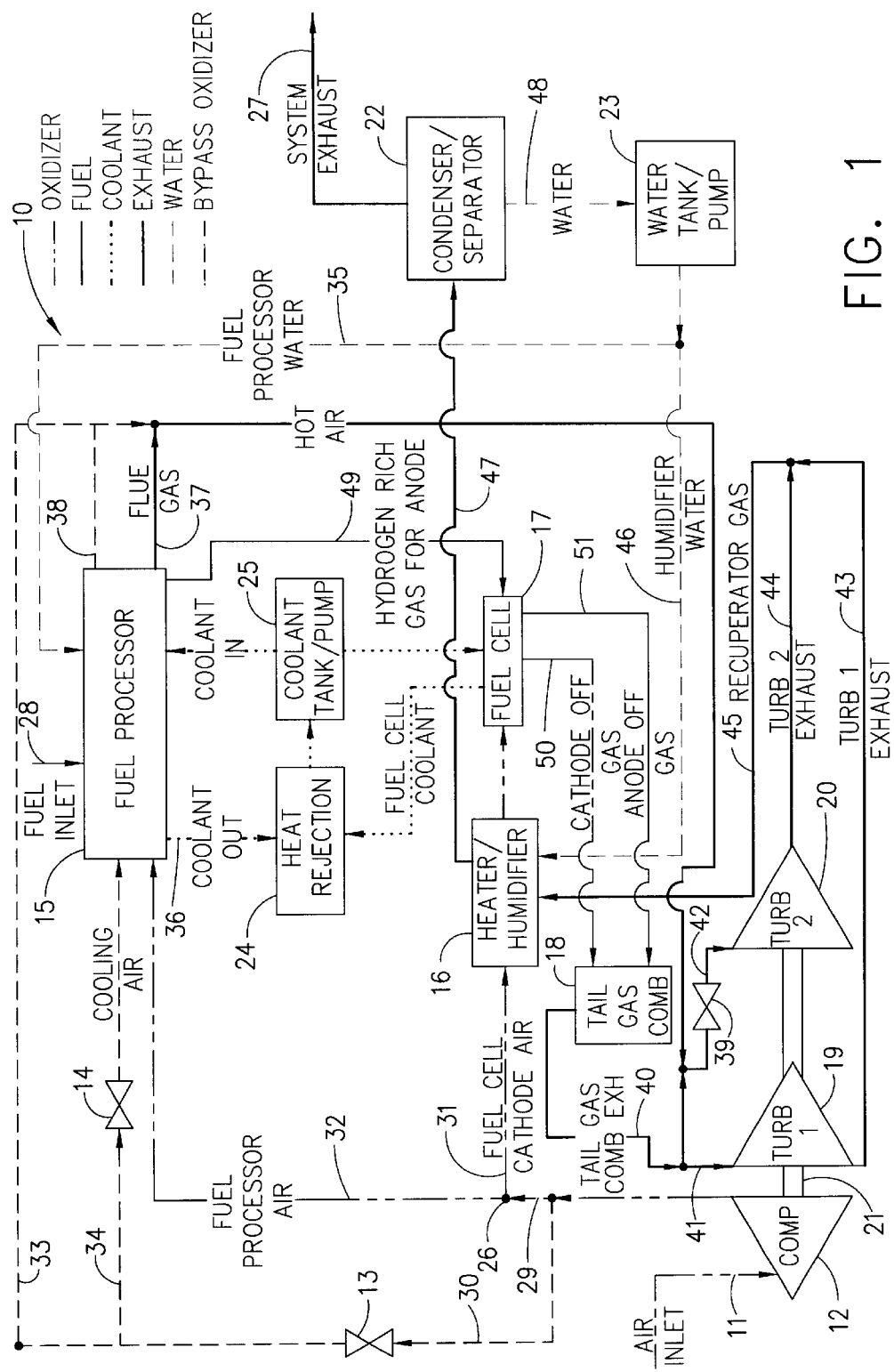
FIG. 1 is a schematic diagram of a first embodiment of the fuel cell power plant system of the present invention.

The present invention generally addresses the issue of optimal overall fuel cell system integration. In many applications, the fuel supplied to a fuel cell power plant system—such as gasoline, natural gas, methanol—must be converted into a hydrogen rich stream prior to entering the fuel cell stack. This conversion can be accomplished in a fuel processor that must be integrated into the whole system, since the fuel processor may or may not require for its operation compressed air, water in a liquid or steam form, and coolant to remove excess heat. The present invention provides a means of integrating the fuel processor in the fuel cell power plant system while maximizing the overall system efficiency.

The present invention also specifically addresses the issue of flattening the turbocompressor operating line and maintaining high compressor and turbine efficiencies in a fuel cell power plant system. At part loads in past designs, the compressor is usually forced to operate at a higher pressure and, thus, at a higher flow. This typically provides more airflow to the fuel cell than it needs. In the present invention, however, the excess compressed air can be passed to an additional turbine on the same shaft as the compressor, thereby reducing the compression power and increasing the overall system efficiency, in addition to decreasing the fuel cell size. With two turbines engaged to a compressor in the present invention, the turbine efficiencies can be optimized at two operating points rather than one. This is because the flow through the two turbine nozzle areas can be varied to achieve the maximum turbine efficiencies. This configuration has an operational advantage over a turbine with a variable nozzle area because it does not have the mechanical design complexity of a variable nozzle turbine and is easier to control. The additional turbine power can be increased if an additional heat source (such as the fuel processor) is available in the system to heat-up the excess compressed air.

While four preferred embodiments of the present invention are described below, they can be generally described as providing an airflow from a compressor that is split or divided into two portions or parts. A first portion supplies the fuel cell stack with the required oxygen for power generation. If a fuel processor also requires oxygen, some of the first portion can be diverted into the fuel processor. A second part of the airflow from the compressor may or may not go through the fuel processor and cools its streams at predetermined locations via heat exchangers. The split ratio between the first and second portions is controlled by a bypass valve or other suitable means including a splitter or orifice, for example.

Whether or not the second portion of air passes through the fuel processor, the second portion is then passed through a second turbine to generate compression power. The first portion of air is used in the fuel cell stack to generate power and burn any unused hydrogen in a combustor. The combustor exhaust can then be supplied to the first and second turbines to recover the compression power either directly or via the fuel processor where it is used for process heating. The flow split between the first and second turbines is accomplished by a distribution valve or other suitable means including a splitter or orifice, for example.

The first turbine's design point is at a part load power level. That means that the turbine efficiency is at maximum at part load, however the first turbine may achieve choking conditions at high power levels. The flow split avoids choking the first turbine at high power levels. The exhaust from the two turbines are then combined and either recycled into the fuel cell system for recuperation purposes to preheat and humidify the fuel cell inlet air or directly to a condenser/separator.

Figure 2:
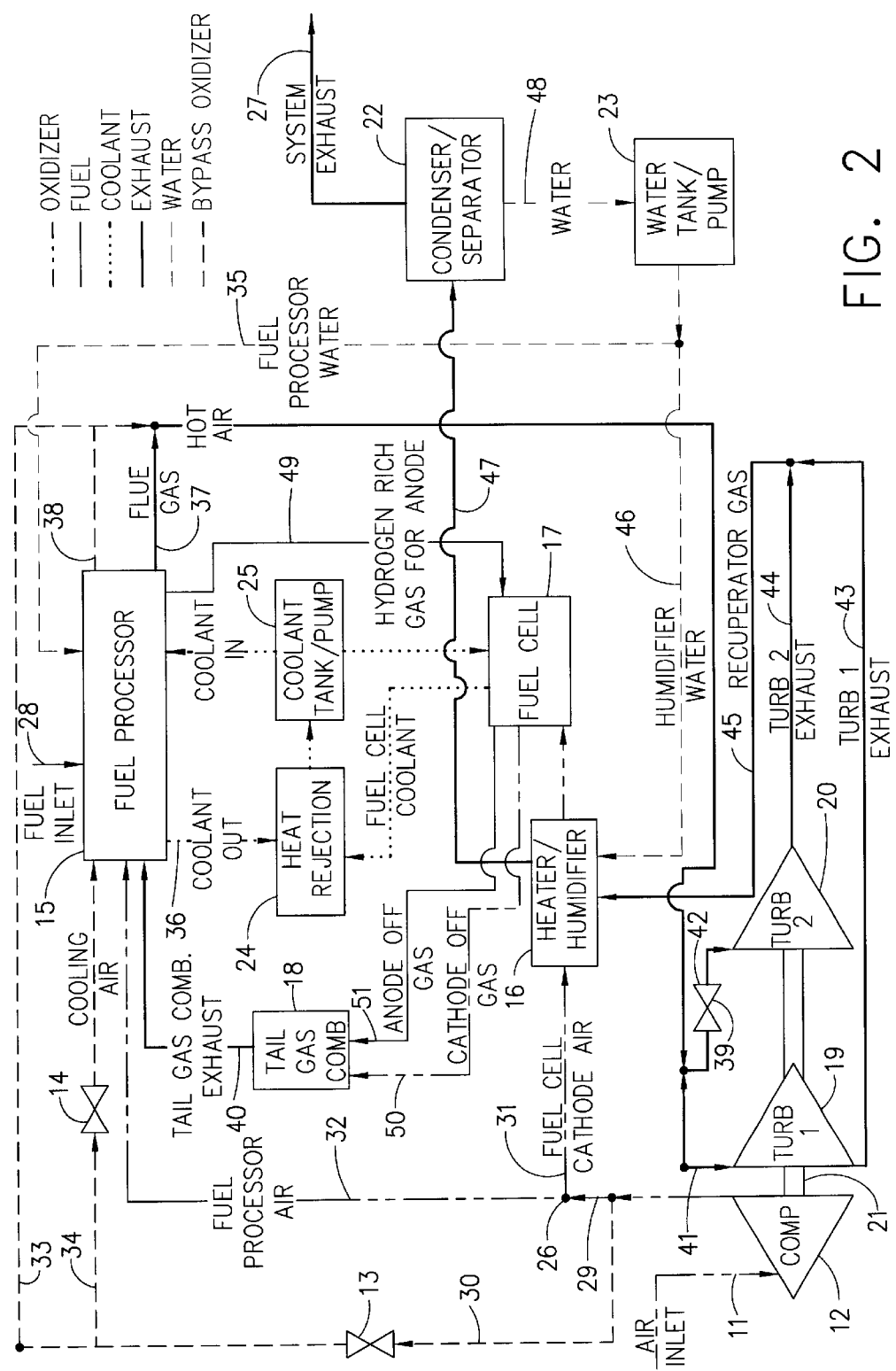
FIG. 2 is a schematic diagram of a second embodiment of the fuel cell power plant system of the present invention.

The four embodiments of the present invention are shown in FIG. 14. FIG. 1 schematically depicts a first embodiment of the apparatus and method of the present invention. The first embodiment is generally characterized and distinguished from the other embodiments as providing a combustor 18 that provides a combustor exhaust to a first turbine 19 and a second turbine 20. A combined turbine exhaust from the first and second turbines 19, 20 is used by a heater/humidifier 16 for fuel cell air heating and/or humidification. In the present embodiment, heating and humidification is accomplished by spraying liquid water into the air stream and vaporizing it using the exhaust heat, although other means may be used. FIG. 2 schematically depicts a second embodiment of the present invention and generally uses the combustor 18 to provide the combustor exhaust to a fuel processor 15, as opposed to the first and second turbines 19, 20. The combined turbine exhaust is again used for fuel cell air heating and/or humidification by the heater/humidifier 16.

Figure 3:
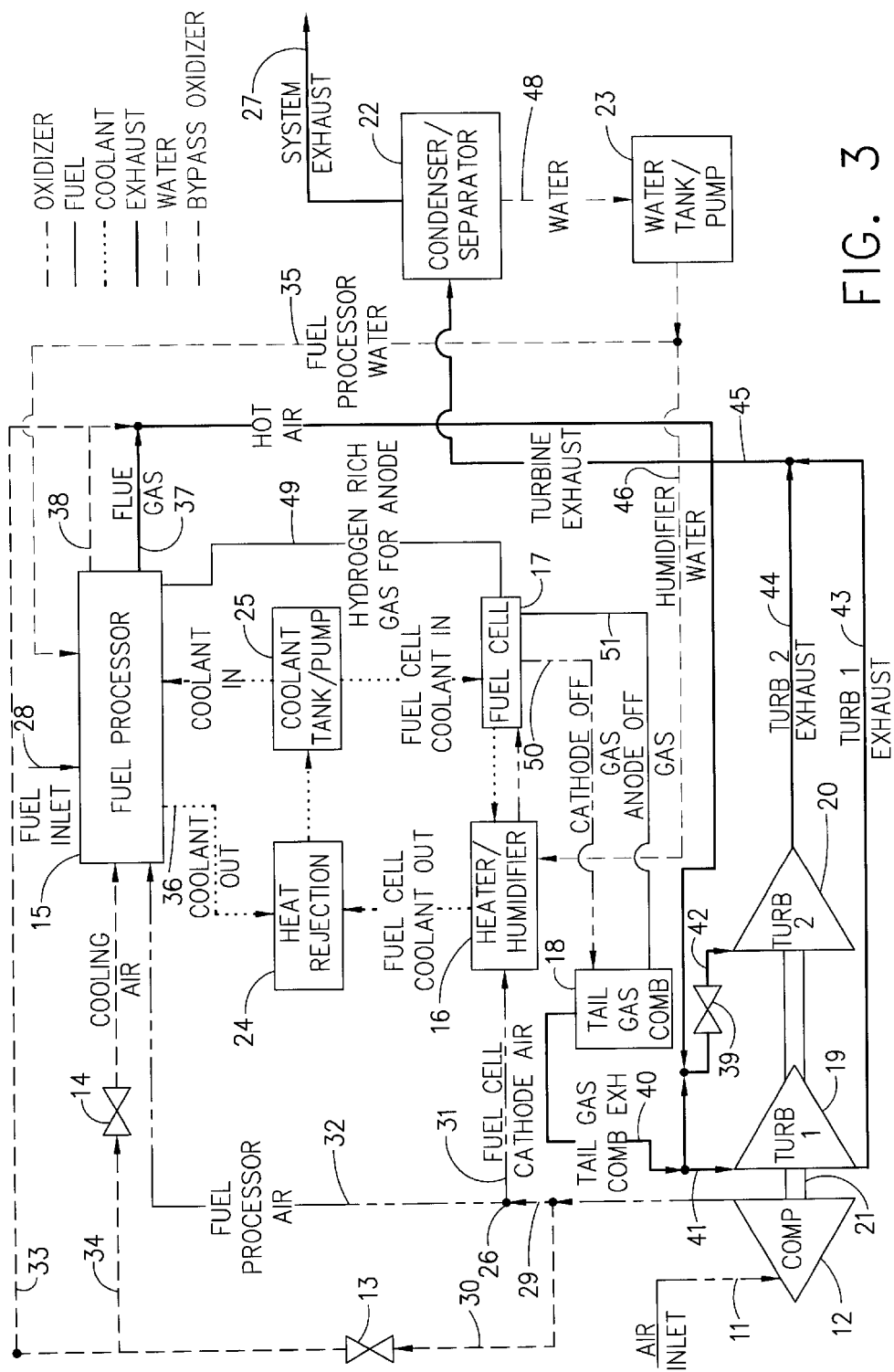
FIG. 3 is a schematic diagram of a third embodiment of the fuel cell power plant system of the present invention.
Figure 4:
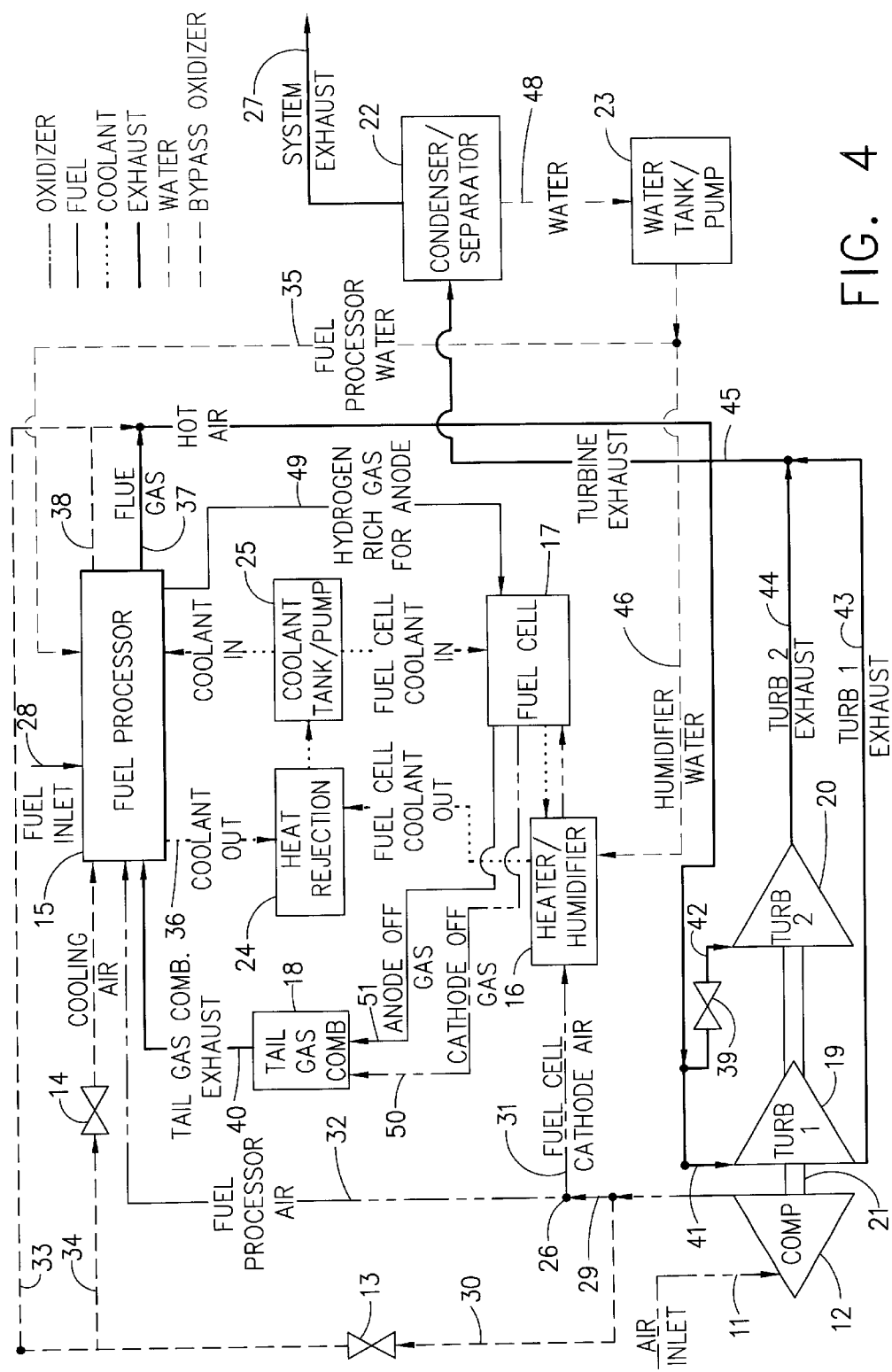
FIG. 4 is a schematic diagram of a fourth embodiment of the fuel cell power plant system of the present invention.

FIG. 3 schematically depicts a third embodiment of the present invention and is generally distinguished from the other embodiments by the combustor exhaust being directed to the first and second turbines. Rather than the combined turbine exhaust, a coolant is used for fuel cell air heating and/or humidification by the heater/humidifier 16. FIG. 4 schematically depicts a fourth embodiment of the present invention wherein the combustor exhaust is directed to the fuel processor 15 and a coolant is again used for fuel cell air heating and/or humidification.

In more specifically describing the first embodiment of the present invention with reference to FIG. 1, an inlet air or oxidant gas 11 is flowed to a compressor 12 whereby the air is compressed. From the compressor, a compressed oxidant gas is split into a first portion 29 that flows to a splitter 26 and a second portion 30 that flows to a bypass valve 13. The bypass valve 13 functions to control the split ratio between the first and second portions 29, 30. The splitter 26 functions to split the first portion 29 of compressed oxidant gas into a first subportion 31 that can flow to the heater/humidifier 16 and into a second subportion 32 that can flow to the fuel processor 15. The splitter 26 is also able to regulate the split ratio between the first and second subportions 31, 32. Accordingly, the splitter 26 can be of various designs, such as a valve, a three-way valve, a combination of two valves, an orifice, or a combination of orifices. Likewise, the functions of bypass valve 13 and splitter 26 can together be accomplished with a combination of two-way valves, a combination of threeway valves, or a combination of orifices.

With the second portion 30 of compressed oxidant gas passing through the bypass valve 13, the second portion 30 of compressed oxidant gas can completely bypass the fuel processor 15. Optionally, the second portion 30 can be split into a third subportion 33: and a fourth subportion 34 by virtue of a regulator valve 14 or other suitable means. Thereby, the third subportion 33 of oxidant gas can bypass the fuel processor 15 while the fourth subportion 34 of oxidant gas can pass through the regulator valve 14 and enter the fuel processor 15.

For the third subportion 33 of air that bypasses the fuel processor 15, it flows in parallel to the first and second turbines 19, 20 that are further described below. For the fourth portion 34 of air that enters the fuel processor 15, the latter can be of any well-known design that preferably incorporates a steam reforming or partial oxidation or auto thermal reforming stage, a high temperature water-gas shift reaction stage, a low temperature water-gas shift reaction stage, and a selective oxidation stage. The fuel processor 15 converts an inlet fuel 28 into a hydrogen containing reformate upon the receipt of a fuel processor water 35, a coolant 36, and/or the fourth portion 34 of oxidant gas. Typically, the fuel processor 15 performs some initial carbon monoxide reduction as a result of the water-gas shift reactions. Additionally, and as a result of receiving the water, the fuel processor 15 may also condition the humidity and the temperature of the inlet fuel 28 for subsequent carbon monoxide removal and fuel cell application.

The coolant 36 used by the fuel processor 15 may be provided by a coolant tank/pump 25 in flow communication with a heat rejection element 24 such as a heat exchanger or radiator/fan whereby heat is exchanged to the environment. Thereby, the coolant 36 can flow into the fuel processor 15, absorb heat therein, flow out of the fuel processor 15, exchange heat to the environment and recycle back into the coolant tank/pump 25. The coolant used by the fuel cell stack 17 may be provided by the coolant tank/pump 25 in flow communication with the heat rejection element 24 such as a heat exchanger or radiator/fan whereby heat is exchanged to the environment. In the present embodiment, coolant 36 and also coolant from the fuel cell 17 are mixed prior to or within the heat rejection element 24. The fuel processor water 35 used in the fuel processor 15 may be provided by a water tank/pump 23 that is fed water 35 by the condenser/separator 22.

From the fuel processor 15, a flue gas 37 may combine with an oxidant gas 38 and the third portion 33 of air that has bypassed the fuel processor 15. The flue gas 37 is the byproduct of fuel and air combustion that is used to generate heat for the purpose of producing steam in the fuel processor. The combined gases provide a hot air that then combines with a combustor exhaust 40 flow from a combustor 18 described below. The produced heated oxidant gas or air flows to the first and second turbines 19, 20 downstream of the fuel processor 15 and operating in parallel flow communication with one another as mentioned above. In contrast to past designs, the first and second turbines 19, 20 are mechanically and rotatingly engaged to one another, as well as to the compressor 12, via a shaft 21.

Also in contrast to past designs, the heated oxidant gas to the first and second turbines 19, 20 is split into first and second portions 41 and 42 by a distribution valve 39. With the distribution valve 39, the first and second portions 41, 42 of heated oxidant gas split between the first and second turbines 19, 20 can be varied. The flow split can be equal, but preferably it is unequal. An unequal split may be desirable, for example, to better balance the system 10. In other words, the efficiencies of the first and second turbines 19, 20 can be optimized at varying power demands of the system 10. For example, it is preferable to route the majority of the flow to the first turbine 19 at low power levels of system 10. Since the first turbine 19 nozzle area is sized for low power levels, the system 10 operating pressure will be high and the turbine 19 efficiency will be at its maximum, which will result in high system efficiencies. At higher power levels, the first turbine 19 nozzle area is not capable of accommodating the high turbine flow, hence the turbine flow distribution valve 39 must be open to allow the excess flow to pass through the second turbine 20. The second turbine 20 nozzle area is also sized for relatively low flow, thus high operating system pressures are maintained at high power levels as well, and the second turbine 20 efficiency is relatively high. Both these effects result in higher system efficiency. Therefore, both high system pressure and turbine efficiencies can be maintained at high levels throughout the system power range, if the turbine nozzle areas are sized appropriately and the flow between the turbines is optimally distributed using the turbine flow distribution valve 39.

From the first turbine 19, a first turbine exhaust 43 is produced, and from the second turbine 20 a second turbine exhaust 44 is produced. The first and second exhausts 43 and 44 combine into a combined turbine exhaust or recuperator gas 45. In this embodiment, the combined turbine exhaust 45 flows into the heater/humidifier or recuperator 16 that is intermediate the second turbine 20 and the condenser/separator 22 mentioned above. In the heater/humidifier 16, the first subportion of oxidant gas 31 coming from the compressor 12 is heated by virtue of heat exchange with the combined turbine exhaust stream 45. The first subportion of oxidant gas 31 is also humidified by virtue of a humidified water 46 from the water tank/pump 23 described above and heat exchange with combined turbine exhaust stream 45. With the first subportion of oxidant gas 31 heated and humidified, the same is flowed into the downstream fuel cell stack 17. Concurrently, the combined turbine exhaust 45 that has been cooled due to heat exchange with first subportion of oxidant gas 31 flows to condenser/separator 22.

In the condenser/separator 22, water vapor in the humidified, combined turbine exhaust 47 is subjected to condensation to produce a system exhaust 27 and water 48. The water 48 then flows into the water/tank pump 23 for circulation into the heater/humidifier 16 as described above. The fuel cell stack 17 may be of various well-known designs including proton exchange membrane fuel cell (PEMFC), solid oxide fuel cell (SOFC), molten carbonate fuel cell (MCFC), or phosphoric acid fuel cell (PAFC). However, the present invention is of particular utility for a fuel cell stack 17 comprising proton exchange membrane fuel cells. This utility is due to the fact that PEMFC are more amenable to operating under part load conditions due to their ability to tolerate thermal cycling to a greater degree than higher temperature fuel cells (such as MCFC, SOFC, PAFC). Nevertheless, the present invention is of utility with any fuel cell stack when the fuel cell system is anticipated to operate at part load. The present invention as shown in the embodiments of FIGS. 1–4 is of particular utility for a fuel cell stack 17 comprising proton exchange membrane fuel cells due to the fact that the PEMFC requires both the anode and cathode gases to be humidified.

In any event, the fuel cell stack 17 receives an anode gas or hydrogen rich gas 49 produced by the fuel processor 15. The anode gas 49 is then reacted with the first subportion of oxidant gas 31. The reaction produces a cathode exhaust or off gas 50 and an anode exhaust or off gas 51, both of which are burned in the combustor 18. The combustor 18 that is intermediate the fuel cell stack 17 and the first and second turbines 19, 20 produces the combustor exhaust 40. The combustor exhaust 40 is then fed to the first and second turbines 19, 20 for expansion and recovery of compression power.

In the second embodiment of the present invention shown in FIG. 2, the apparatus and process steps remain the same as in the first embodiment. However, the second embodiment provides for the combustor exhaust 40 to be fed directly to the fuel processor 15, rather than directly to the first and second turbines 19, 20. Doing so allows the combustor exhaust 40 to be used for process heating in the fuel processor 15. Eventually, however, the combustor exhaust 40 flows to the first and second turbines 19, 20 for expansion and recovery of compression power.

FIG. 3 depicts a third embodiment of the present invention that includes apparatus and process steps that are the same as the first embodiment. The primary difference from the first embodiment, however, is that the combined turbine exhaust 45 is sent to a downstream condenser/separator 22, rather than the heater/humidifier 16. Accordingly, the coolant 36 from the fuel cell stack 17 is used for fuel cell air heating and/or humidification in the heater/humidifier 16.

The fourth embodiment of the present invention, as shown in FIG. 4, provides the same apparatus and process steps as the third embodiment. However, in the fourth embodiment, the combustor exhaust 40 is fed to the fuel processor 15 instead of the first and second turbines 19, 20.

EXAMPLES

Figure 5:
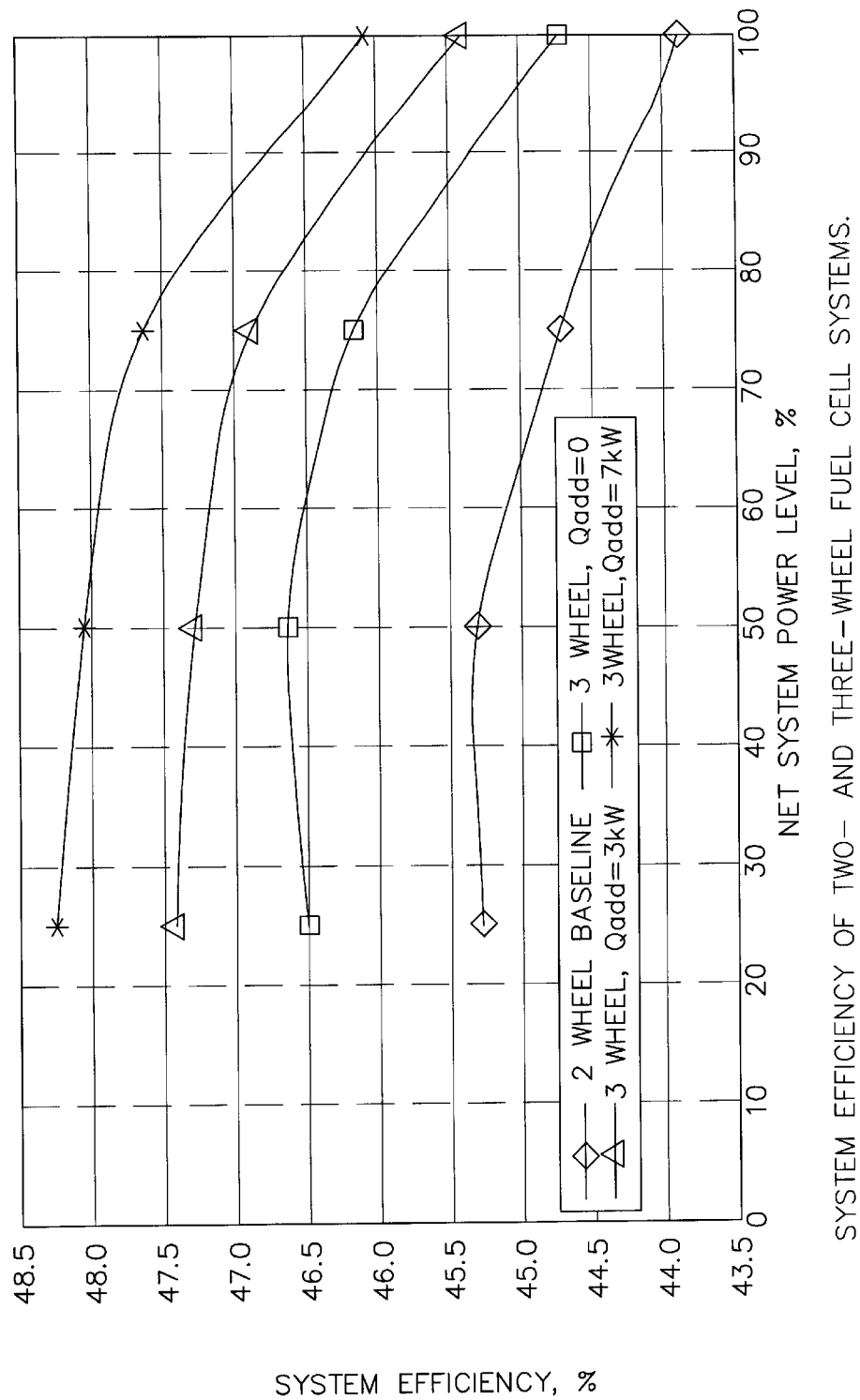
FIG. 5 is a graph of system efficiency versus net system power level for a prior art two-wheel fuel cell power plant system and for a three-wheel system according to the present invention.

Analyses have shown that the total system efficiency can be increased throughout the system power range with the introduction of a second turbine and turbine nozzle. The graph in FIG. 5 is of system efficiency versus net system power level for a two-wheel fuel cell system having a single compressor and single turbine such as that described in Ferrall et al. "Design and Development of an Air-Reformate PEM Fuel Cell Stack System for Light-Duty Vehicles", Proceedings of 2000 Future Car Congress, Apr. 2–6, 2000, Arlington, Va., as well as the three-wheel system of the present invention shown in FIG. 1. In the two-wheel system, the turbine nozzle area was 0.28 $in^2$. In the three-wheel system, the first turbine nozzle area was 0.15 $in^2$ and the second turbine nozzle area was 0.13 $in^2$. FIG. 5 indicates that the efficiency improvement can be as much as about 1.5 percentage points across the system power range. If additional heat is available to preheat the second turbine inlet stream, then the efficiency improvement becomes significant and can reach about 3 to 4 percentage points.

Figure 6:
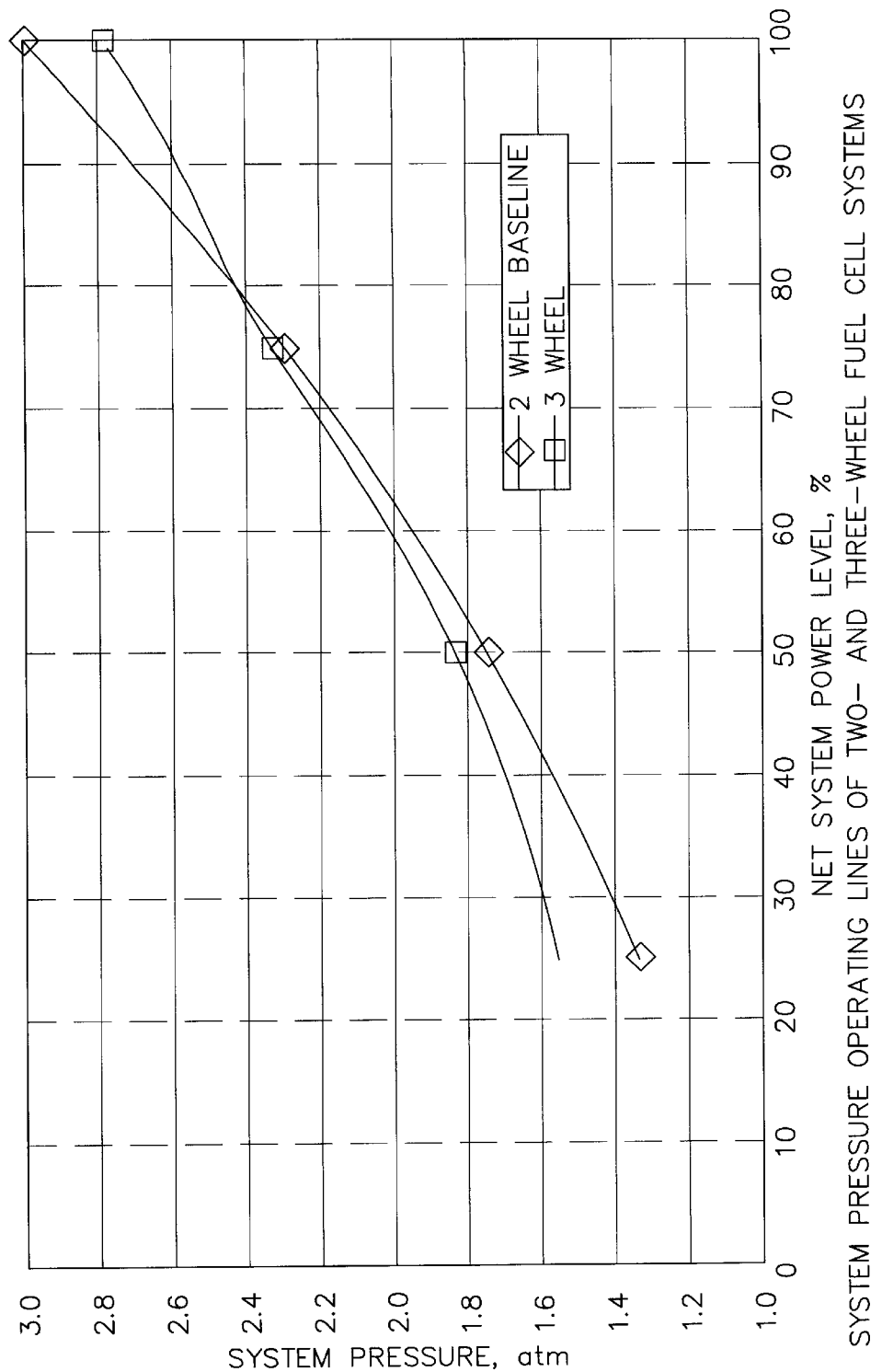
FIG. 6 is a graph of system pressure versus net system power level for the two-wheel and three-wheel fuel cell power plant systems shown in FIG. 5.

FIG. 6 is a graph of system pressure versus net system power level for the two-wheel system and three-wheel system used in FIG. 5. The efficiency improvement of the present invention is made possible by improved compressor and turbine efficiencies and an improved system pressure operating line, as shown in FIG. 6.

Figure 7:
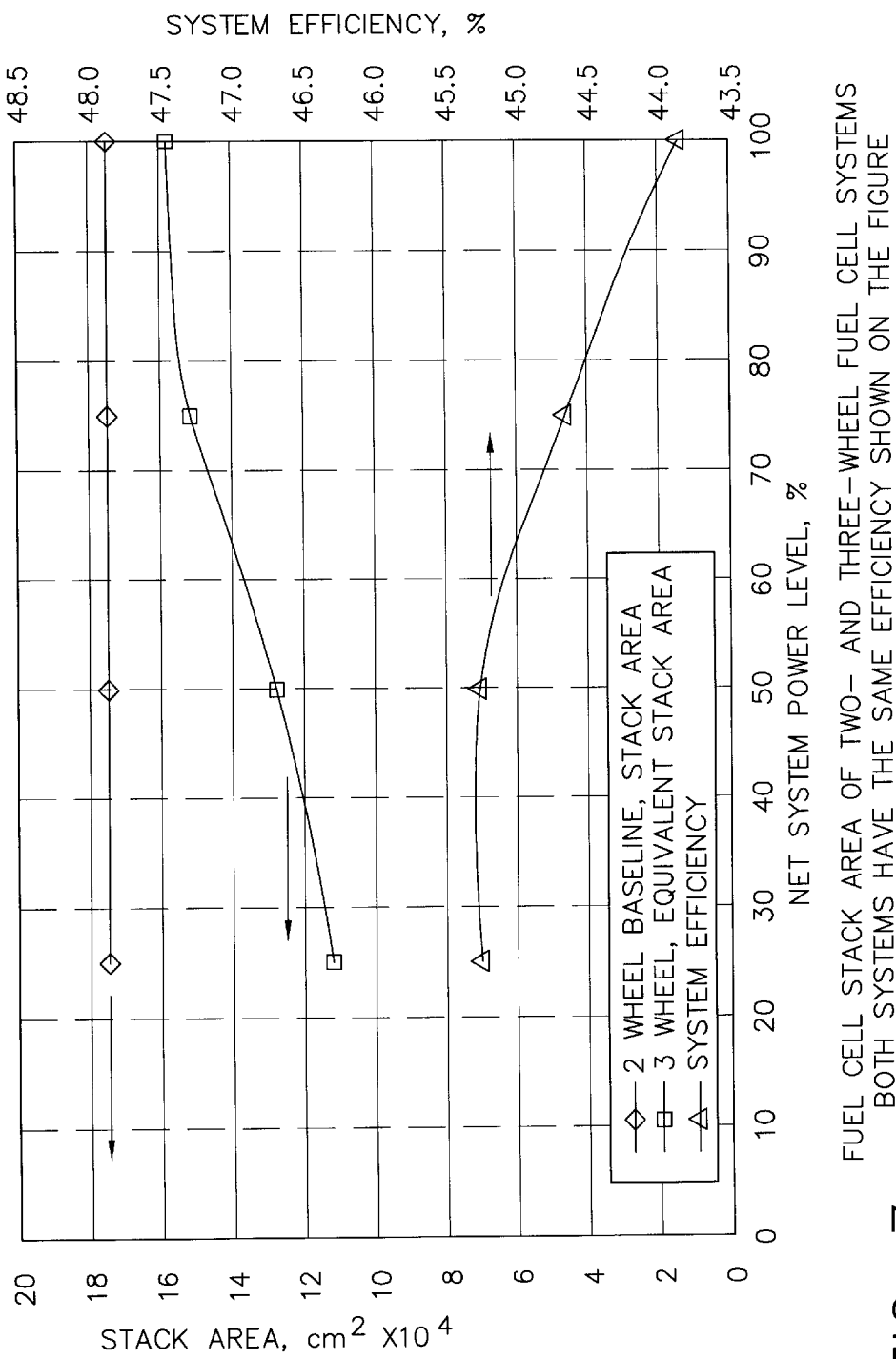
FIG. 7 is a graph of stack area versus net system power level for the two-wheel and three-wheel fuel cell power plant systems shown in FIG. 5.

The efficiency improvements can provide significant stack size savings. FIG. 7 is a graph of stack area versus net system power level for the two and three wheel systems. FIG. 7 shows the comparison of the stack active area for the baseline two-wheel system with that of a three-wheel system if the stack was sized to match the corresponding two-wheel efficiency. In particular, FIG. 7 indicates that if the stack was sized to meet efficiency requirements at the one-quarter power load then the three-wheel system would result in a stack area savings of about 36%. Since the fuel cell stack is by far the most expensive component of a fuel cell system, this would result in the three-wheel system being nearly one-third less costly, and potentially smaller, than the two-wheel system. The savings from the stack area reduction should by far offset the additional cost associated with a more complicated turbocompressor machine.

Figure 8:
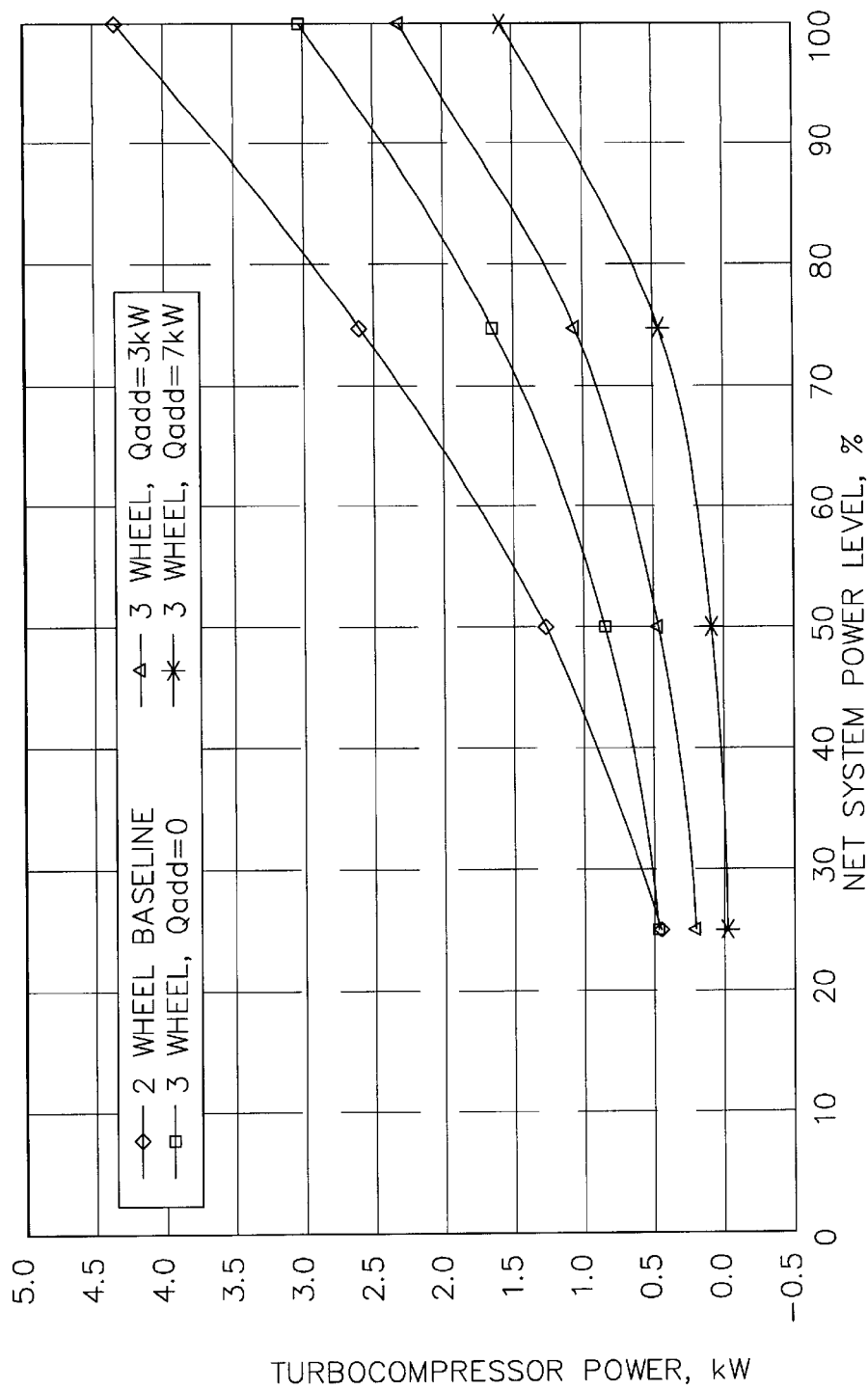
FIG. 8 is a graph of turbocompressor power versus net system power level for the two-wheel and three-wheel fuel cell power plant systems shown in FIG. 5.

The improved turbocompressor efficiencies also result in lower requirements on the turbocompressor power. FIG. 8 indicate such results from a graph of turbocompressor power versus net system power level for the two and three wheel systems. The turbocompressor power could become negative at some operating point with a significant amount of the additional heat input, i.e., the turbocompressor generates power rather than consumes it. Alternatively, this result can be viewed as an opportunity to eliminate the turbocompressor motor altogether, i.e., operate in a regime when the output of the two turbines matches the compressor load.

It should be understood, of course, that the foregoing relates to preferred embodiments of the invention and that modifications may be made without departing from the spirit and scope of the invention as set forth in the following claims.

We claim:

1. A fuel cell system, comprising:
   a compressor;
   a fuel processor downstream of said compressor;
   a fuel cell stack in communication with said fuel processor and compressor;
   a first turbine downstream of said fuel processor; and
   a second turbine downstream of said fuel processor, said second turbine being mechanically engaged to said compressor and first turbine.

2. The system of claim 1, further comprising a bypass valve intermediate said compressor and second turbine, said bypass valve enabling a compressed gas from said compressor to bypass said fuel processor.

3. The system of claim 1, further comprising a distribution valve in communication with said first and second turbines.

4. The system of claim 1, further comprising a combustor downstream of said fuel cell stack.

5. The system of claim 1, further comprising a heater/humidifier intermediate said compressor and fuel cell stack.

6. The system of claim 1, further comprising a condenser/separator downstream of said first and second turbines.

7. The system of claim 6, further comprising a heater/humidifier intermediate said condenser/separator and said first and second turbines.

8. The system of claim 1, further comprising members that split a flow of said compressed gas from said compressor and direct said compressed gas to both of said fuel processor and fuel cell stack.

9. The system of claim 1, wherein said first and second turbines are in parallel flow communication with one another.

10. The system of claim 1, wherein said fuel processor exchanges heat to an oxidant gas that flows in parallel to said first and second turbines.

11. The system of claim 1, further comprising members that combine exhaust from said first turbine with exhaust from said second turbine to produce a combined turbine exhaust.

12. A fuel cell system, comprising:
   a compressor;
   a fuel processor downstream of said compressor;
   a fuel cell stack in communication with said fuel processor and compressor;
   a first turbine downstream of said fuel processor;
   a second turbine downstream of said fuel processor and in parallel flow communication with said first turbine, said second turbine being mechanically engaged to said compressor and first turbine; and
   a distribution valve in communication with said first and second turbines.

13. The system of claim 12, further comprising a bypass valve intermediate said compressor and second turbine, said bypass valve enabling a compressed gas from said compressor to bypass said fuel processor.

14. The system of claim 12, further comprising a combustor that is intermediate said fuel cell stack and first turbine.

15. The system of claim 12, wherein said combustor is intermediate said fuel cell stack and fuel processor.

16. A fuel cell system, comprising:
   a compressor;
   a fuel processor downstream of said compressor;
   a fuel cell in communication with said fuel processor;
   a heater/humidifier intermediate said compressor and fuel cell;
   a first turbine downstream of said fuel processor; and
   a second turbine downstream of said fuel processor and in parallel flow communication with said first turbine, said second turbine being mechanically engaged to said compressor and first turbine.

17. The system of claim 16, further comprising a distribution valve in communication with said first and second turbines.

18. The system of claim 16, wherein said heater/humidifier is downstream of said first and second turbines.

19. The system of claim 18, further comprising a condenser/separator downstream of said heater/humidifier.

20. The system of claim 16, further comprising a condenser/separator downstream of said second turbine.

21. A fuel cell system, comprising:
   a compressor;
   a fuel processor downstream of said compressor;
   a fuel cell stack in communication with said fuel processor;
   a first turbine downstream of said fuel processor;
   a second turbine downstream of said fuel processor and in parallel flow communication with said first turbine, said second turbine being mechanically engaged to said compressor and first turbine; and
   a condenser/separator downstream of said second turbine.

22. The system of claim 21, further comprising a heater/humidifier intermediate said second turbine and condenser/separator.

23. The system of claim 21, further comprising a heater/humidifier downstream of said condenser/separator.

24. A method of processing an oxidant gas and a fuel gas for a fuel cell system, comprising:
   compressing said oxidant gas in a compressor to produce a compressed oxidant gas;
   flowing a first portion of said compressed oxidant gas to a fuel cell stack;
   flowing a second portion of said compressed oxidant gas to a fuel processor;
   flowing said fuel gas to said fuel processor to produce a hydrogen-rich gas;
   flowing said hydrogen-rich gas to said fuel cell stack;
   producing a heated oxidant gas from said fuel processor;
   splitting said heated oxidant gas into a first portion and a second portion of heated oxidant gas such that said first and second portions of heated oxidant gas flow parallel to one another;
   expanding said first portion of said heated oxidant gas in a first turbine to produce a first turbine exhaust;
   expanding said second portion of said heated oxidant gas in a second turbine to produce a second turbine exhaust; and
   rotatingly engage said compressor, first turbine and second turbine to one another.

25. The method of claim 24, wherein said compressed oxidant gas is split to produce said first and second portions of compressed oxidant gas.

26. The method of claim 24, further comprising humidifying said first portion of compressed oxidant gas flowing to said fuel cell stack.

27. The method of claim 24, further comprising combusting an anode exhaust gas with a cathode exhaust gas, both of which are from said fuel cell stack, to produce a combustor exhaust.

28. The method of claim 27, further comprising expanding said combustor exhaust in said first turbine.

29. The method of claim 27, further comprising flowing said combustor exhaust to said fuel processor.

30. The method of claim 24, further comprising condensing water vapor from a humidified oxidant flow downstream of said second turbine.

31. A fuel cell system, comprising:
   a compressor that provides a flow of compressed oxidant gas;
   a splitter member in communication with said compressed oxidant gas flow from said compressor that splits said compressed gas flow into a first portion flow and a second portion flow;
   a fuel cell stack that is downstream of said compressor and is in communication with said compressor and receives said first portion flow and that is in communication with said fuel processor;
   a fuel processor that is downstream of said compressor and is in communication with and receives said second portion flow;
   a first turbine downstream of said fuel processor;
   a second turbine downstream of said fuel processor, said second turbine being mechanically engaged to said compressor and first turbine; and
   a distribution valve in communication with said fuel processor and with said first and second turbines that distributes gas that flows from said fuel processor to said first and second turbines.

32. The system of claim 31, further comprising a bypass valve intermediate said compressor and second turbine, said bypass valve enabling a compressed gas from said compressor to bypass said fuel processor.

33. The system of claim 31, further comprising a combustor downstream of said fuel cell stack.

34. The system of claim 31, further comprising a heater/humidifier intermediate said compressor and fuel cell stack.

35. The system of claim 31, further comprising a condenser/separator downstream of said first and second turbines.

36. The system of claim 35, further comprising a heater/humidifier intermediate said condenser/separator and said first and second turbines.

37. The system of claim 31, wherein said first and second turbines are in parallel flow communication with one another.

38. The system of claim 31, wherein said fuel processor exchanges heat to an oxidant gas that flows in parallel to said first and second turbines.

39. The system of claim 31, further comprising members that combine exhaust from said first turbine with exhaust from said second turbine to produce a combined turbine exhaust.

40. A method of processing an oxidant gas for a fuel cell system, comprising:

compressing said oxidant gas in a compressor to produce a compressed oxidant gas;

flowing a first portion of said compressed oxidant gas to a fuel cell stack and a second portion to a fuel processor;

exhausting a heated oxidant gas from said fuel cell stack;

flowing a first portion of said heated oxidant gas to a first turbine wherein said first compressed oxidant gas portion expands and wherefrom expanded gas is exhausted to produce a first turbine exhaust;

flowing a second portion of said heated oxidant gas to a second turbine wherein said second compressed oxidant gas portion expands and wherefrom expanded gas is exhausted to produce a second turbine exhaust; and engaging said compressor, first turbine and second turbine with one another.

41. The method of claim 40, further comprising a distribution valve in communication with said first and second turbines.

42. The method of claim 40, further comprising disposing said first and second portions of said heated oxidant gas in parallel to one another.

43. The method of claim 40, wherein said first and second turbines are disposed in parallel to one another.

44. The method of claim 43, further comprising combining said first and second turbine exhausts to produce a combined turbine exhaust.

45. The method of claim 44, further comprising flowing said combined turbine exhaust through a heater/humidifier intermediate said compressor and said fuel cell stack.

46. The method of claim 44, further comprising flowing said combined turbine exhaust through a condenser/separator.

47. The method of claim 40, further comprising humidifying said first compressed oxidant air portion.

48. The method of claim 40, further comprising flowing a cathode exhaust gas from said fuel cell stack to a combustor.

49. The method of claim 48, wherein said combustor is intermediate said fuel cell stack and first turbine.

50. The method of claim 40, wherein said combustor is intermediate said fuel cell stack and fuel processor.

51. The method of claim 40, wherein a heated oxidant gas is exhausted from said fuel processor.

52. The method of claim 51, further comprising combining said heated oxidant gas from said fuel processor with said heated oxidant gas exhausted from said fuel cell stack.

53. A method of processing an oxidant gas and a fuel gas for a fuel cell system, comprising:

compressing said oxidant gas in a compressor to produce a compressed oxidant gas;

splitting said compressed oxidant gas to produce first and second portions of compressed oxidant gas;

flowing said first compressed oxidant gas portion to a fuel cell stack;

flowing said second compressed oxidant gas portion to a fuel processor;

flowing said fuel gas to said fuel processor to produce a hydrogen-rich gas;

flowing said hydrogen-rich gas to said fuel cell stack;

producing a heated oxidant gas from said fuel processor;

splitting said heated oxidant gas into a first portion and a second portion of heated oxidant gas such that said first and second portions of heated oxidant gas flow parallel to one another;

flowing said first portion of said heated oxidant gas to a first turbine wherein said first compressed oxidant gas portion expands and wherefrom expanded gas is exhausted to produce a first turbine exhaust;

flowing said second portion of said heated oxidant gas to a second turbine wherein said second compressed oxidant gas portion expands and wherefrom expanded gas is exhausted to produce a second turbine exhaust; and rotatingly engaging said compressor, first turbine and second turbine one with another.

54. The method of claim 53, further comprising humidifying said first portion of compressed oxidant gas prior to the step of flowing said first portion of said compressed oxidant gas to said fuel cell stack.

55. The method of claim 53, further comprising combusting an anode exhaust gas with a cathode exhaust gas, both of which are from said fuel cell stack, to produce a combustor exhaust.

56. The method of claim 55 further comprising expanding said combustor exhaust in said first turbine.

57. The method of claim 56, further comprising flowing said combustor exhaust to said fuel processor.

58. The method of claim 54, further comprising condensing water vapor from a humidified oxidant flow downstream of said second turbine.

* * * * *